United States Patent
Huke et al.

(10) Patent No.: US 11,127,250 B1
(45) Date of Patent: Sep. 21, 2021

(54) AI SPORTS BETTING ALGORITHMS ENGINE

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US); Harrison Grant, Anaheim, CA (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/108,343

(22) Filed: Dec. 1, 2020

Related U.S. Application Data (60) Provisional application No. 63/111,792, filed on Nov. 10, 2020.

(51) Int. Cl.
  *G07F 17/32* (2006.01)
  *G06Q 50/34* (2012.01)
  *G06N 20/00* (2019.01)

(52) U.S. Cl.
  CPC .......... *G07F 17/323* (2013.01); *G06N 20/00* (2019.01); *G06Q 50/34* (2013.01); *G07F 17/3244* (2013.01); *G07F 17/3288* (2013.01)

(58) Field of Classification Search
  CPC .............. G07F 17/3288; G07F 17/323; G07F 17/3244; G06Q 50/34; G06N 20/00
  See application file for complete search history.

(56) References Cited

U.S. PATENT DOCUMENTS

| | | | |
|---|---|---|---|
| 9,076,305 B2 | 7/2015 | Amaitis et al. | |
| 2002/0068633 A1 | 6/2002 | Schlaifer | |
| 2012/0214575 A1* | 8/2012 | Amaitis | G07F 17/3293 463/25 |
| 2015/0262456 A1* | 9/2015 | Shore | G07F 17/3288 463/25 |
| 2015/0287278 A1* | 10/2015 | Shore | G07F 17/3223 463/29 |
| 2017/0039811 A1* | 2/2017 | Devaraj | G07F 17/3288 |
| 2018/0330281 A1 | 11/2018 | Teller et al. | |
| 2019/0197836 A1* | 6/2019 | Huke | G07F 17/3223 |
| 2019/0251794 A1 | 8/2019 | Simon et al. | |
| 2019/0295382 A1* | 9/2019 | Huke | G07F 17/3276 |
| 2019/0392684 A1* | 12/2019 | McDonald | G07F 17/3211 |
| 2020/0111325 A1* | 4/2020 | Lockton | G07F 17/323 |
| 2020/0234543 A1* | 7/2020 | Schwartz | G07F 17/3223 |

FOREIGN PATENT DOCUMENTS

WO 2020076657 A1 4/2020

* cited by examiner

*Primary Examiner* — Steve Rowland
(74) *Attorney, Agent, or Firm* — Maier & Maier, PLLC (57) ABSTRACT

A system for wagering on outcomes of a live sporting event. The system further includes using AI to balance itself between how much it will lose bets to encourage game players to bet more, ultimately to win more profit and gain a larger game player user base. This allows the system to reduce immediate profits in exchange for long term profits due to a larger market share.

11 Claims, 4 Drawing Sheets

Content - High Level Diagram

Fig.1 Content - High Level Diagram

Fig.2 betting algorithms module Object Content

Fig.3 cross module Object Content

| Algorithm | Cross | Cross B | ... | Cross |
|---|---|---|---|---|
| AB | 42.80% | 43.97% | ... | 44.72% |
| AC | 46.44% | 41.89% | ... | 44.78% |
| AD | 43.57% | 43.57% | ... | 44.86% |
| ABC | 42.80% | 42.96% | ... | 44.51% |
| - | - | - | ... | - |
| - | - | - | ... | - |

Fig.4 cross database Data Content

Fig.5 final odds module Object Content

Fig.6 AI comparison module Object Content

Fig.7 machine learning module Object Content

Fig.8 odds adjustment module Object Content

| Original Odds | Adjusted Odds | Timestamp |
|---|---|---|
| 40% | 43% | 11/5/2020 4:46:19 AM |
| 15% | 17% | 11/5/2020 4:48:21 AM |
| 34% | 36% | 11/5/2020 4:49:54 AM |
| - | - | - |
| - | - | - |

Fig.9 odds adjustment database Data Content

AI SPORTS BETTING ALGORITHMS ENGINE

FIELD

The present embodiments are generally related to play by play wagering on live sporting events

BACKGROUND

Offerors of fixed odd wagers set the odds they offer to a value that will statistically yield a profit despite the outcome of the event being wagered on. However, because of the slight advantage of the wager offeror, over time long-term players will begin to notice a pattern of loss. Further, if odds are set too low, short term profits may increase but less bets may be placed over time if there is a diminished incentive to bet.

To remedy this issue, offerors of wagers often adjust odds to payout better in order to incentivize current or past players or to draw in new players. However, this ultimately will result in some amount of loss to the offeror of the wagers. Any entity that offers wagers must then balance the odds such that the entity is still profitable but also retains as many current players and draws in as many new players as possible.

BRIEF DESCRIPTIONS OF THE DRAWINGS

The accompanying drawings illustrate various embodiments of systems, methods, and various other aspects of the embodiments. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "bet" or "wager". A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog+4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, or perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are services that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, by creating and delivering actionable insights on performance to help customers to manage the sports gaming. Business Applications can be integrated into the embodiments in a variety of manners.

State based integration allows for a given sports gambling game to be modified by states in the United States or other countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

Figure 1:
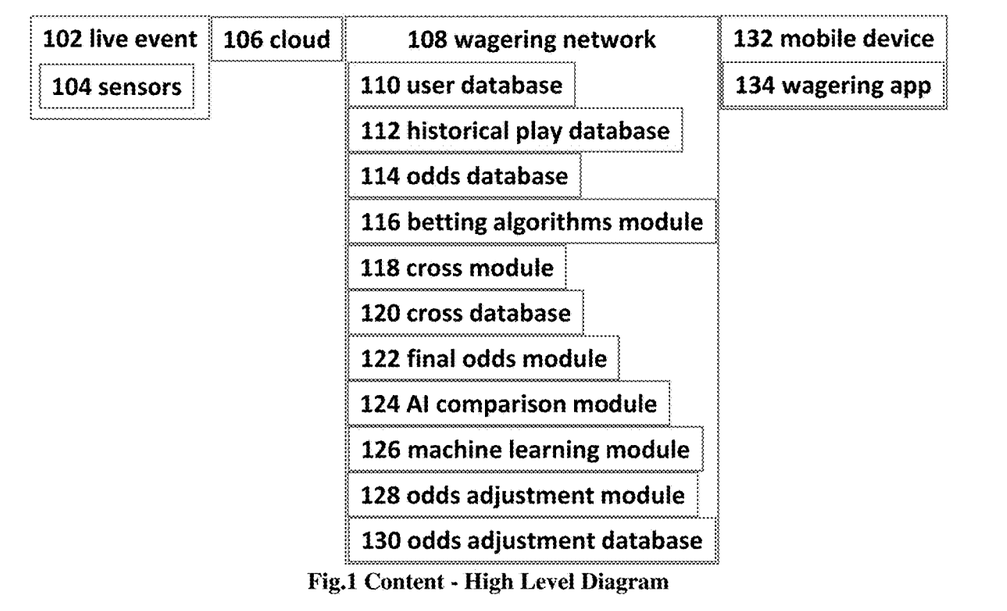
FIG. 1: Illustrates a method of displaying a notification from a betting application using AI that can impact normal betting, according to an embodiment.

FIG. 1 is a system for a method of displaying a notification from a betting application using AI that can impact normal betting. This system is comprised of a live event 102, for example a sporting event such as a football game, basketball game, baseball game, hockey game, tennis match, golf tournament, eSports or digital game, etc. The live event 102 will include some number of actions or plays, upon which a user or bettor or customer can place a bet or wager, typically through an entity called a sportsbook. There are numerous types of wagers the bettor can make, including, a straight bet, a money line bet, a bet with a point spread or line that bettor's team would need to cover, if the result of the game was the same as the point spread the user would not cover the spread, but instead the tie is called a push. If the user is betting on the favorite, they are giving points to the opposing side, which is the underdog or longshot. Betting on all favorites is referred to as chalk, this is typically applied to round robin, or other styles of tournaments. There are other types of wagers, including parlays, teasers, and prop bets, that are added games, that may allow the user to customize their betting by changing the odds and payouts they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event 102, such as the score of American football or the run line in baseball, or a series of action in the live event 102. Sportsbooks have a number of bets they can handle, a limit of wagers they can take on either side of a bet before they will move the line or odds off of the opening line. Additionally, there are circumstance, such as an injury to an important player such as a listed pitcher, in which a sportsbook, casino or racino will take an available wager off the board. As the line moves there becomes an opportunity for a bettor to bet on both sides at different point spreads in order to middle and win both bets. Sportsbooks will often offer bets on portions of games, such as first half bets and half-time bets. Additionally, the sportsbook can offer futures bets on live events 102 in the future. Sportsbooks need to offer payment processing services in order to cash out customers. This can be done at kiosks at the live event 102 or at another location.

Further, embodiments may include a plurality of sensors 104 that may be used such as motion sensors, temperature sensors, humidity sensors, cameras such as an RGB-D Camera which is a digital camera capturing color (RGB) and depth information for every pixel in an image, microphones, a radiofrequency receiver, a thermal imager, a radar device, a lidar device, an ultrasound device, a speaker, wearable devices etc. Also, the plurality of sensors 104 may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that captures statistical information through real-time X, Y positioning of players and X, Y, Z positioning of the ball.

Further, embodiments may include a cloud 106 or communication network which may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, such as over Internet, and relies on sharing of resources to achieve coherence and economies of scale, like a public utility, while third-party clouds enable organizations to focus on their core businesses instead of expending resources on computer infrastructure and maintenance. The cloud 106 may be communicatively coupled to a wagering network 108 which may perform real time analysis on the type of play and the result of the play. The cloud 106 may also be synchronized with game situational data, such as the time of the game, the score, location on the field, weather conditions, and the like which may affect the choice of play utilized. For example, in some exemplary embodiments, the cloud 106 may not receive data gathered from the plurality of sensors 104 and may, instead, receive data from an alternative data feed, such as SportsRadar®. This data may be provided substantially immediately following the completion of any play and the data from this feed may be compared with a variety of team data and league data based on a variety of elements, including down, possession, score, time, team, and so forth, as described in various exemplary embodiments herein.

Further, embodiments may include the wagering network 108 which may perform real time analysis on the type of play and the result of a play or action. The wagering network 108 (or cloud 106) may also be synchronized with game situational data, such as the time of the game, the score, location on the field, weather conditions, and the like which may affect the choice of play utilized. For example, in some exemplary embodiments, the wagering network 108 may not receive data gathered from the plurality of sensors 104 and may, instead, receive data from an alternative data feed, such as SportsRadar®. This data may be provided substantially immediately following the completion of any play and the data from this feed may be compared with a variety of team data and league data based on a variety of elements, including down, possession, score, time, team, and so forth, as described in various exemplary embodiments herein. The wagering network 108 may offer a number of software as a service managed services such as, user interface service, risk management service, compliance, pricing and trading service, IT support of the technology platform, business applications, game configuration, state based integration, fantasy sports connection, integration to allow the joining of social media, and marketing support services that can deliver engaging promotions to the user.

Further, embodiments may utilize a user database 110 which contains data relevant to all users of the system, which may include, a user ID, a device identifier, a paired device identifier, wagering history, and wallet information for each user.

Further, embodiments may include a historical play database 112, that contains play data for the type of sport being played in the live event 102. For example, in American Football, for optimal odds calculation, the historical play data should include meta data about the historical plays, such as time, location, weather, previous plays, opponent, physiological data, etc.

Further, embodiments may utilize an odds database 114 that contains the odds calculated by the odds calculation module, and the multipliers for distance and path deviation, and is used for reference by the base wagering module 118 and to take bets from the user through a user interface and calculate the payouts to the user.

Further, embodiments may utilize a betting algorithms module 116 that calculates odds for the next play of the live event 102 using a number of different known algorithms, then sends the odds calculated by each algorithm to a cross module 118. Further, embodiments may utilize the cross module 118 which combines the odds received from the betting algorithms module 116 in every possible combination, for example, if there are 5 different odds generated from 5 different algorithms, the cross module 118 will calculate the combinations for 1 and 2, 1 and 3, 1 and 4, 1 and 5, 1, 2, and 3, etc. These combinations are then stored in a cross database 120. Further, embodiments may utilize a cross database 120 which contains all the combinations of odds calculated by the cross module 118 for the current play of the live event 102.

Further, embodiments may utilize a final odds module 122 which uses the odds stored in the cross database and the odds stored in the odds database to create the final odds for a play. The final odds module 122 prompts an AI comparison module 124 to determine how all of the calculated odds should be used in determining the final odds.

Further, embodiments may utilize the AI comparison module 124 which prompts an odds adjustment module 128 to adjust the odds stored in the odds database 114, then compares each of the odds in the cross database 120 to determine the accuracy of the odds generated by the cross module 118.

Further, embodiments may utilize a machine learning module 126 which determine how the historically generated final odds match the actual historical outcomes of plays. This data may be used to enhance the accuracy of the final odds module 122. Further, embodiments may utilize the odds adjustment module 128 which adjusts the odds in order to maximize user interest while also accounting for risk of loss. The odds adjustment module estimates profit increase due to increased user interest and compares that value to expected loss and adjusts the odds accordingly in order to maximize the ratio of profit return.

Further, embodiments may utilize an odds adjustment database 130 which stores the odds adjustment made by the odds adjustment module 128 along with a timestamp.

Further, embodiments may include a mobile device 132 such as a computing device, laptop, smartphone, tablet, computer, smart speaker, or I/O devices. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WII, Nintendo WII U GAMEPAD, or Apple IPHONE. Some devices allow gesture recognition inputs through combining some of the inputs and outputs. Some devices allow for facial recognition which may be utilized as an input for different purposes including authentication and other commands. Some devices provide for voice recognition and inputs, including, e.g., Microsoft KINECT, SIRI for IPHONE by Apple, Google Now or Google Voice Search. Additional user devices may have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, a mouse or optical pen. Furthermore, an I/O device may also contain storage and/or an installation medium for the computing device. In still other embodiments, the computing device may include USB connections (not shown) to receive handheld USB storage devices. In further embodiments, an I/O device may be a bridge between the system bus and an external communication bus, e.g. a USB bus, a SCSI bus, a FireWire bus, an Ethernet bus, a Gigabit Ethernet bus, a Fiber Channel bus, or a Thunderbolt bus. In some embodiments the mobile device 132 could be an optional component and may be utilized in a situation in which a paired wearable device is utilizing the mobile device 132 as additional memory or computing power or as a connection to the internet.

Further, embodiments may include a wagering app 134, which is a program that enables the user to place bets on individual plays in the live event 102, and display the audio and video from the live event 102, along with the available wagers on the mobile device 132. The wagering app 134 allows the user to interact with the wagering network 108 in order to place bets and provide payment/receive funds based on wager outcomes.

Figure 2:
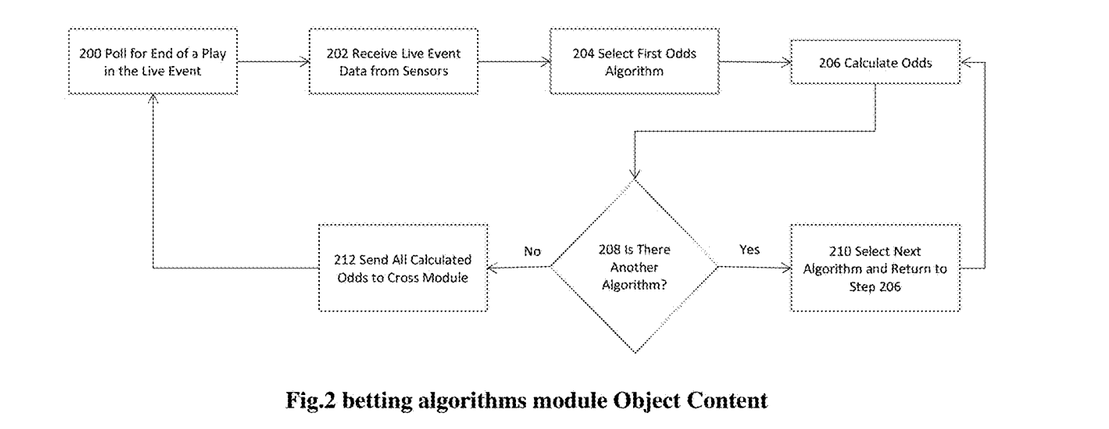
FIG. 2: Illustrates a betting algorithms module, according to an embodiment.

FIG. 2 illustrates the betting algorithms module 116. The process begins with the betting algorithms module 116 polling, at step 200, for the end of a play of the live event 102 via the plurality of sensors 104, or any other event which would be followed by a play such as the beginning of the game or the end of a time-out. The betting algorithms module 116 receives, at step 202, data about the current state of the live event 102 from the plurality of sensors 104. For example, the live event 102 features the Minnesota Vikings against the Green Bay Packers, the Packers are on offense, it is 1st and 10 and 7 minutes from half-time, and the weather is 6 mph winds. The betting algorithms module 116 selects, at step 204, a first betting odds algorithm. These algorithms are each part of the betting algorithms module 116, in some embodiments the algorithms may be stored in a database and retrieved. Algorithms could be, for example, a series of steps, or even an entire separate module, designed to find profitable sports betting opportunities. They use vast amounts of data from past sporting matches so as to identify patterns, which can then be used to calculate the probability of certain sporting outcomes. Example algorithms include betting arbitrage, betting bank, unit stakes, Kelly's Criterion, and Monte Carlo. The betting algorithms module 116 calculates, at step 206, odds for the upcoming play of the live event 102 based on the selected algorithm. For example, algorithm A may calculate that the odds of the next play being a pass are 42.4% while algorithm B calculates the odds at 46.7%. In embodiments where the algorithm is itself a separate module the betting algorithms module 116 receives the odds instead. The betting algorithms module 116 determines, at step 208, if there is another algorithm that has not yet been used to calculate odds for this upcoming play. If there is another algorithm, the betting algorithms module 116 selects, at step 210, the next algorithm and returns to step 206. If there are no other algorithms, the betting algorithms module 116 sends, at step 212, all calculated odds to the cross module 118, then returns to step 200.

Figure 3:
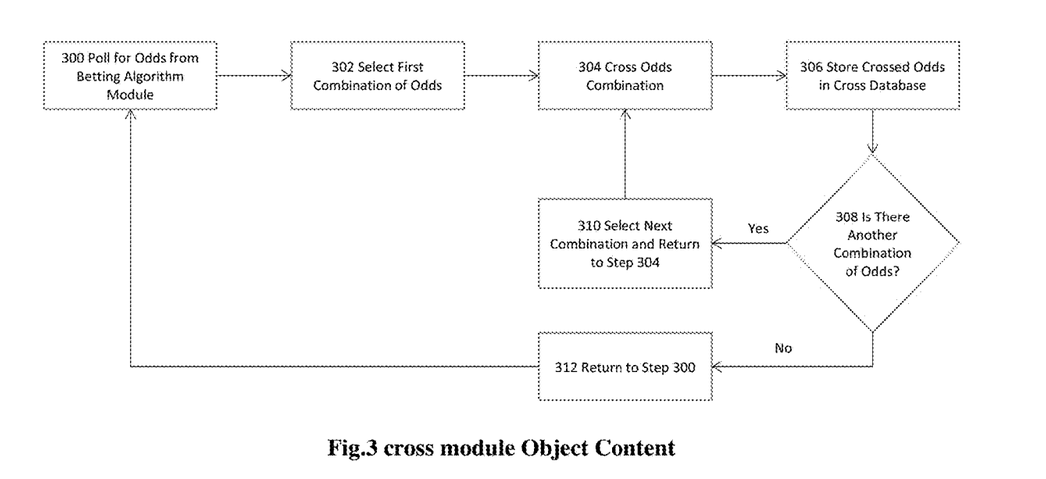
FIG. 3: Illustrates a cross module, according to an embodiment.

FIG. 3 illustrates the cross module 118. The process begins with the cross module 118 polling, at step 300, for a set of odds from the betting algorithm module, each separate odds being generated by a different algorithm. The cross module 118 selects, at step 302, the first combination of odds, for example if there are five different odds received from the betting algorithm module, then the first combination would be the first and second odds. The cross module 118 crosses, at step 304, the combination of odds. Crossing odds is a mathematical process by which odds are combined via different methods, for example, the mean of the combination of odds, the median of the combination of odds, the mode of the combination of odds, etc. Crossing odds then results in multiple crossed odds outputs. For example, if we cross the odds 20%, 30%, and 50%, the results would be 33.3% for the average, but 30% for the median. The cross module 118 stores, at step 306, all the resulting crossed odds in the cross database 120 along with the combination and method of crossing. For example, the odds from algorithm A and algorithm B are crossed by crossing method A for a result of 42.80%, and crossing method B for a result of 43.97%. These results are stored in the cross database. The cross module 118 determines, at step 308, if there is another combination of odds that has not yet been crossed. If there is another combination of odds, the cross module 118 selects, at step 310, the next combination of odds and returns to step 304. If there are no other combinations of odds, the cross module 118 returns, at step 312, to step 300.

Figure 4:
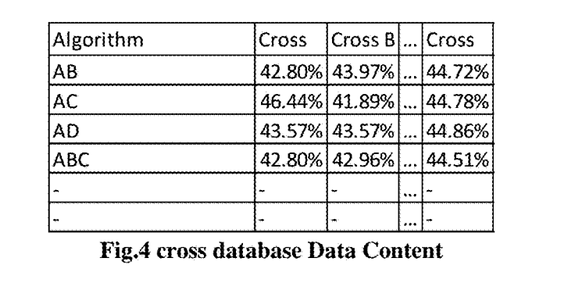
FIG. 4: Illustrates a cross database, according to an embodiment.

FIG. 4 illustrates the cross database 120. The cross database 120 contains all the combinations of odds calculated by the cross module 118 for the current play of the live event 102. Each entry contains an algorithm combination, for example, "AB" which denotes the combination of odds generated by those algorithms, and the result of each different cross. Cross A may be, for example, the mean value of the odds, whereas cross B may be the median value. In some embodiments the cross database 120 may also contain identifiers for the outcome the odds are predicting, such as pass or run, and identifiers for which play and live event 102 the odds correspond to. In some embodiments the cross database may be purged with each new play of a live event 102.

Figure 5:
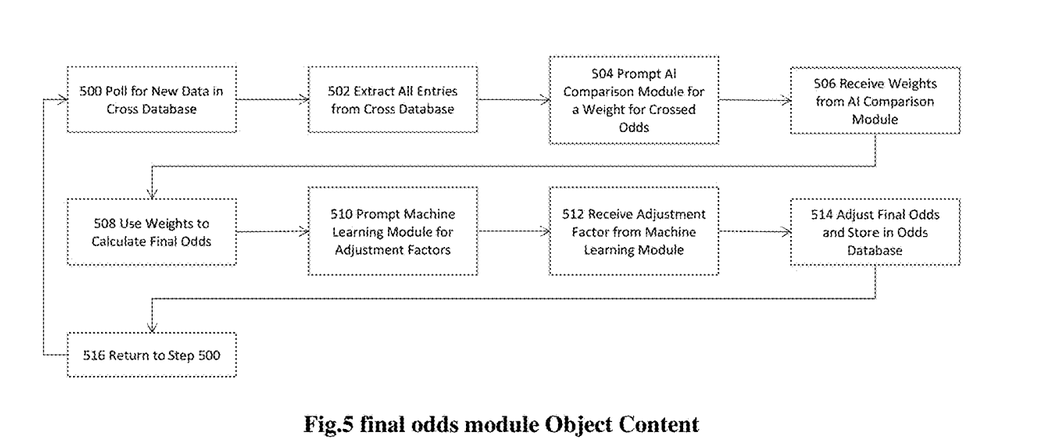
FIG. 5: Illustrates a final odds module, according to an embodiment.

FIG. 5 illustrates the final odds module 122. The process begins with the final odds module 122 polling, at step 500, for new data in the cross database 120. The final odds module 122 extracts, at step 502, all entries from the cross database 120. In embodiments where the cross database 120 contains crossed odds from multiple plays the final odds module 122 may extract only the entries that predict the odds for the upcoming play of the live event 102. The final odds module 122 prompts, at step 504, the AI comparison module 124 for a weight for each crossed odds, meaning the odds from each unique combination of algorithms and crossing method. The final odds module 122 receives, at step 506, a set of weights from the AI comparison module 124 corresponding to each crossed odds. The final odds module 122 calculates, at step 508, the final odds by taking a weighted average of all crossed odds. For example, the odds from algorithms A and B crossed by method A, 42.80%, is given a weight of 0.9 while the odds from the algorithms A and B crossed by method B, 43.97%, is given a weight of 0.6. The odds from algorithm A and B crossed by method A are multiplied by the weight 0.9, and the odds from the algorithm A and B crossed by method B are multiplied by 0.6, the two resulting values are divided by the sum of all weights, resulting in odds of 43.27%. The final odds module 122 prompts, at step 510, the machine learning module 126 for an adjustment factor which is based on the historical accuracy of the final odds module 122. The final odds module 122 receives, at step 512, an adjustment factor from the machine learning module 126. The final odds module 122 adjusts, at step 514, the final odds based on the adjustment factor and then stores the final odds in the odds database 114. For example, the machine learning module 126 determines that the final odds predicted passes at a 2% higher rate than the actual number of passes based on historical data, resulting in an adjustment factor of 0.98. The weighted average, 43.27%, is multiplied by 0.98 resulting in final odds for the next play being a pass of 42.40%. In some embodiments the final odds may be stored separately from the historical odds in the odds database 114, in other embodiments the final odds will overwrite the odds already in the odds database 114. The final odds module 122 returns, at step 516, to step 500. In some embodiments the final odds module 122 may poll for play completion before returning to step 500.

Figure 6:
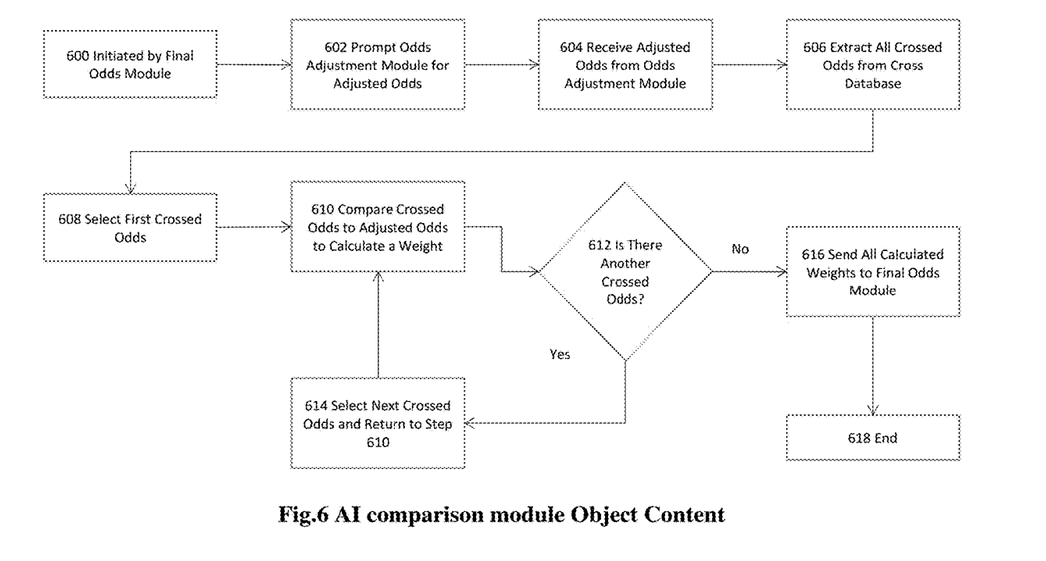
FIG. 6: Illustrates an AI comparison module, according to an embodiment.

FIG. 6 illustrates the AI comparison module 124. The process begins with the AI comparison module 124 being, at step 600, initiated by the final odds module 122. The AI comparison module 124 prompts, at step 602, the odds adjustment module 128 for the original odds stored in the odds database 114 which are then adjusted to optimize both profit and user satisfaction. The AI comparison module 124 receives, at step 604, the adjusted odds from the odds adjustment module 128. The AI comparison module 124 extracts, at step 606, all crossed odds from the crossed database 120. In embodiments where crossed odds for more than one play are stored in the cross database 120 only crossed odds for the upcoming play of the live event 102 will be extracted. The AI comparison module 124 selects, at step 608, the first crossed odds of the extracted crossed odds. The AI comparison module 124 compares, at step 610, the selected crossed odds with the adjusted odds and determines a weight based on the difference. For example, the weight may be the ratio of the lesser odds divided by the greater odds or the adjusted odds divided by the absolute value of the difference between the crossed odd and the adjusted odds. The AI comparison module 124 determines, at step 612, if there is another crossed odd that a weight has not yet been calculated for. If there is another crossed odd, the AI comparison module 124 selects, at step 614, the next crossed odds and returns to step 610. If there are no more crossed odds, the AI comparison module 124 sends, at step 616, the calculated weights for each crossed odds to the final odds module 122. The AI comparison module 124 ends, at step 618.

Figure 7:
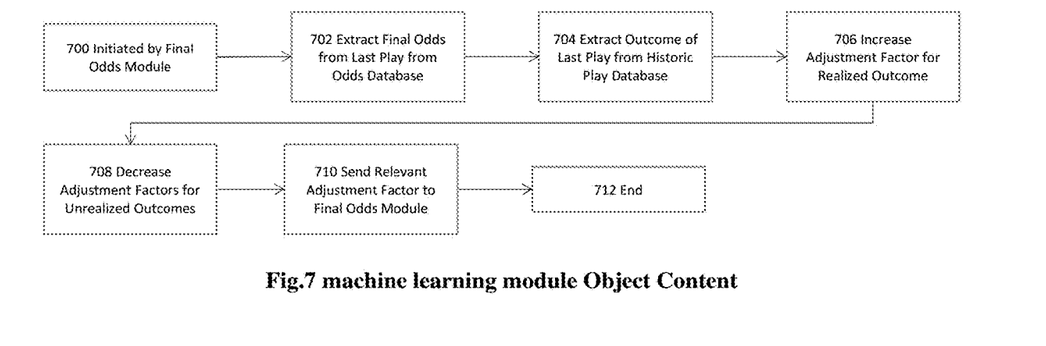
FIG. 7: Illustrates a machine learning module, according to an embodiment.

FIG. 7 illustrates the machine learning module 126. The process begins with the machine learning module 126 being, at step 700, initiated by the final odds module 122. The machine learning module 126 extracts, at step 702, the final odds for the last play of the live event 102 from the odds database 114. The machine learning module 126 extracts, at step 704, the outcome of the last play of the live event 102 from the historic play database 112. The machine learning module 126 increases, at step 706, the adjustment factor for the realized outcome. For example, if the realized outcome is a pass, the adjustment factor for odds for a pass will be increased. Adjustment factors begin at 1 and are changed and saved with each iteration of the machine learning module 126. The machine learning module 126 decreases, at step 708, the adjustment factors for the unrealized outcomes. For example, if the realized outcome is a pass, the adjustment factor for odds for a run will be decreased. Adjustment factors begin at 1 and are changed and saved with each iteration of the machine learning module 126. The machine learning module 126 sends, at step 710, the relevant adjustment factor to the final odds module 122. For example, if the final odds module 122 is only calculating the odds of a pass, then only the adjustment factor for pass odds will be sent. In some embodiments all adjustment factors may be sent and the final odds module 122 will determine which to use. The machine learning module 126 ends at step 712.

Figure 8:
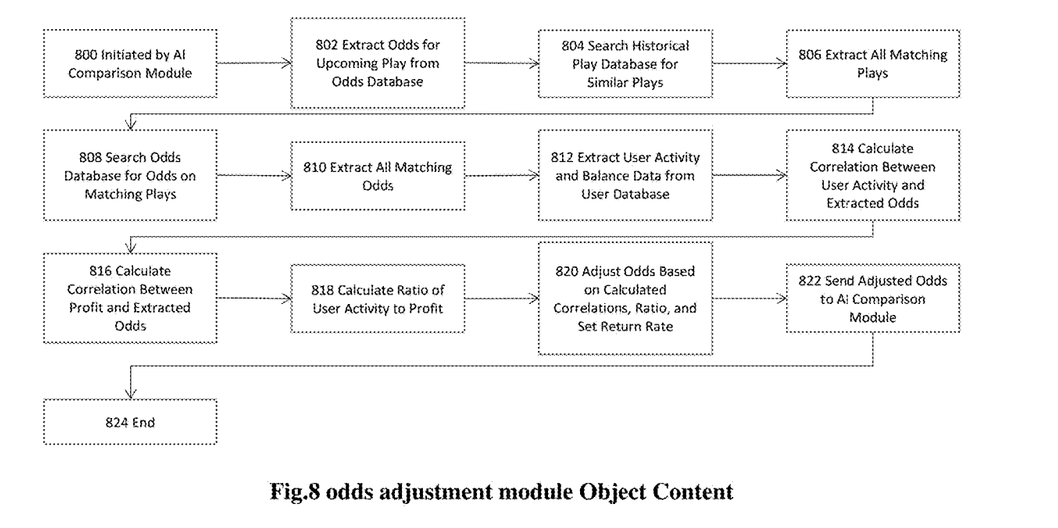
FIG. 8: Illustrates an odds adjustment module, according to an embodiment.

FIG. 8 illustrates the odds adjustment module 128. The process begins with the odds adjustment module 128 being, at step 800, initiated by the AI comparison module 124. The odds adjustment module 128 extracts, at step 802, the odds for the upcoming play of the live event 102 from the odds database 114. The odds adjustment module 128 searches, at step 804, the historical play database 112 for plays with similar parameters to the upcoming play of the live event 102. A play does not need to match all of the parameters of the current state of the live event 102 in order to be similar, for example, a similar play may be one in which the same teams are playing but the wind speed is within 5 mph of the current wind speed, or a play wherein the same team is on offense but a different team is on defense. In some embodiments the criteria for which plays are similar is dynamic and may be determined by a machine learning algorithm. The odds adjustment module 128 extracts, at step 804, data on all plays that are similar to the current state of the live event 102. The odds adjustment module 128 searches, at step 808, the odds database 114 for the odds given to users on all of the extracted plays from the historical play database 112. In some embodiments different odds may be given to different users for the same play, which would increase the accuracy of the correlations calculated in steps 814 and 816. The odds adjustment module 128 extracts, at step 810, all of the matching odds in the odds database 114. The odds adjustment module 128 extracts, at step 812, all data on user activity and user account balance from the user database 110. User activity is the number of bets users place over a given time period such as a week, month, year, or duration of a live event 102. In some embodiments user activity may also include the amount bet, or non-betting activity such as time spent on the wagering app 134. Net changes in user balance in the negative will correspond with profit. In some embodiments profit may be retrieved directly from another database. In some embodiments incentives such as free or discounted credits or wagers may need to be considered in order to accurately assess profit from net user balance changes. The odds adjustment module 128 calculates, at step 814, a correlation coefficient between the extracted odds and user activity. For example, odds with better returns on plays that are similar would be expected to increase user activity because users would be enticed to make a bet on favorable odds. In some embodiments the correlation may be determined by linear correlation, in other embodiments the correlation may be non-linear. Correlation may be calculated using scatter diagram method, Karl Pearson's method, Spearman's rank method, least square method, or any other method known in the art, or any combination of methods. For example, the current play of the live event 102 features the Minnesota Vikings against the Green Bay Packers, the Packers are on offense, it is 1st and 10 and 7 minutes from half-time, and the weather is 6 mph winds. These conditions are similar to other historical plays. The odds given to users for each of the similar historical plays is compared to the user activity level for each play. Using Karl Pearson's method to find a linear correlation coefficient results in a correlation coefficient of 0.85, meaning the odds given and the user activity level are highly correlated. In a second example, the current play of the live event 102 features the Minnesota Vikings against the Green Bay Packers, the Packers are on offense, it is 3rd and 12 and 3 minutes from the start of the game, and the weather is light rain with no wind. These conditions are similar to other historical plays. The odds given to users for each of the similar historical plays is compared to the user activity level for each play. Using Karl Pearson's method to find a linear correlation coefficient results in a correlation coefficient of 0.15, meaning the odds given and the user activity level are not highly correlated. The odds adjustment module 128 calculates, at step 816, a correlation coefficient between the extracted odds and loss of user account balance, which would translate to overall profit by the system. For example, odds with better returns on plays that are similar would be expected to increase user account balance because users would be winning more money on average on more favorable odds. In some embodiments the correlation may be determined by linear correlation, in other embodiments the correlation may be non-linear. Correlation may be calculated using scatter diagram method, Karl Pearson's method, Spearman's rank method, least square method, any other method known in the art, or any combination of methods. For example, the current play of the live event 102 features the Minnesota Vikings against the Green Bay Packers, the Packers are on offense, it is 1st and 10 and 7 minutes from half-time, and the weather is 6 mph winds. These conditions are similar to other historical plays. The odds given to users for each of the similar historical plays is compared to the profit for each play. Using Karl Pearson's method to find a linear correlation coefficient results in a correlation coefficient of −0.92, meaning the odds given and profit are highly correlated. In a second example, the current play of the live event 102 features the Minnesota Vikings against the Green Bay Packers, the Packers are on offense, it is 3rd and 12 and 3 minutes from the start of the game, and the weather is light rain with no wind. These conditions are similar to other historical plays. The odds given to users for each of the similar historical plays is compared to the user activity level for each play. Using Karl Pearson's method to find a linear correlation coefficient results in a correlation coefficient of −0.28, meaning the odds given and the profit are not highly correlated. The odds adjustment module 128 calculates, at step 818, the ratio of user activity to profit by comparing loss of user account balance to user activity level. For example, each month an average of 100,000 users place an average of 2,000,000 bets and on average the net profit for each month is $6,000,000. Using these numbers results in a ratio of user activity to profit of $3 per user per month. This ratio can then be used to determine when it can be valuable to take a loss in exchange for user activity, for example, if the system could get 100 new users at a cost of $600 the estimated time to earn back that cost would be two months assuming the users continue to use the system. In some embodiments this may use the same method as the previous two steps to instead find correlation. The odds adjustment module 128 adjusts, at step 820, the extracted odds for the upcoming play of the live event 102. The odds are adjusted based on a calculation that considers the correlation between profit and odds, the correlation between user activity and odds, the ratio of user activity to profit, and a set return rate. The return rate is the rate at which the administrators of the system are willing to lose profit in the short term for more profit in the long term. For example, if the return rate is 10% per year then the odds adjustment module will adjust the odds to be more favorable to the user such that the amount of profit lost will be returned with a 10% increase over the next year due to increased user activity. If the correlation between odds and user activity is 0.85, and the correlation between odds and profit is −0.92, then increasing the odds will result in more user activity but less profit. Using the ratio of user activity to profit the system can then estimate an increase in odds that will return 10% profit over the next year based on the estimated immediate loss of profit and the estimated increase in user activity due to more enticing odds. If, for example, based on historical data the odds of the next play being a pass are 40%, and the odds adjustment module 128 determines that a 3% increase would result in a $500 dollar loss, but would be estimated to return $550 dollars due to increased user activity, the odds are then adjusted to 43%. The odds adjustment module 128 sends, at step 822, the adjusted odds to the AI comparison Module 124. The odds adjustment module 128 ends, at step 824. It may be appreciated, in some other embodiments, that the odds adjustment module 128 may function in alternative manners rather than just adjusting odds. For example, if it is deemed desirable, based on estimated wagers or user activity, the odds adjustment module 128 could send a notification to one or more users who may have been determined, for example based on wagering history, to place a certain bet that would be desirable or provide a desirable return for an upcoming play. Alternatively, the odds adjustment module 128 could act to lock out or prevent one or more users who may have been determined to place a certain bet that would be undesirable or provide an undesirable return at that time. In still other embodiments, the odds adjustment module 128 could provide an incentive to one or more users to place a certain bet that is determined to be desirable or provide a desirable return.

Figure 9:
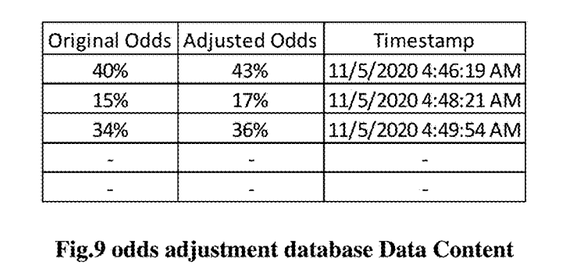
FIG. 9: Illustrates an odds adjustment database, according to an embodiment.

FIG. 9 illustrates the odds adjustment database 130. The odds adjustment database 130 contains the original odds from the odds database 114, for example 40%, the adjusted odds from the odds adjustment module 128, for example 43%, and a timestamp, for example 11/5/2020 4:46:19 AM.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of providing wagers in a play by play wagering system, comprising:

receiving data on a wagering system from a live sporting event upon which wagers can be placed on plays inside of that live event, wherein the play by play wagering system interfaces with at least one of an automated content recognition (ACR) module or at least one sensor to receive the data from a past play in the live sporting event;

calculating in substantially real time, from the data on the past play, two or more different odds for at least one outcome of an upcoming play using two or more different algorithms, wherein the two or more different odds are calculated using at least two of a primary value betting formula, a primary betting arbitrage formula, a betting bank formula, a unit stakes formula, a Kelly's criterion formula, and a Monte Carlo simulation;

comparing, in substantially real time, context of the upcoming play to plays in a historical play database;

retrieving odds of historical plays in the historical plays database that are similar in context to the upcoming play;

estimating a level of user activity on at least one offered wager;

altering the wagering system based on the estimated level of user activity; and further comprising: calculating, in substantially real time, final odds for the at least one offered wager based on an adjustment factor determined by a weighted combination of the two or more different calculated odds and the retrieved odds;

collecting wager data from at least one user related to the final odds, adjusting offered odds on the upcoming play based on the collected wager data and outputting the adjusted offered odds to a wagering application before the upcoming play.

2. The method of providing wagers in a play by play wagering system of claim 1, further comprising retrieving third party analytics related to the live sporting event to determine context of the upcoming play.

3. The method of providing wagers in a play by play wagering system of claim 1, further comprising changing an offered wager based on the estimated level of user activity.

4. The method of providing wagers in a play by play wagering system of claim 1, further comprising notifying one or more users regarding an offered wager based on the estimated level of user activity.

5. The method of providing wagers in a play by play wagering system of claim 1, further comprising offering an incentive to place a wager based on the estimated level of user activity.

6. The method of providing wagers in a play by play wagering system of claim 1, further comprising preventing one or more wagers from one or more users from being placed on the wagering system.

7. The method of providing wagers in a play by play wagering system of claim 1, wherein the upcoming play is a next play in the live action game.

8. The method of providing wagers in a play by play wagering system of claim 7, wherein the upcoming play occurs during the live action game, and the live action game has a time limit.

9. The method of providing wagers in a play by play wagering system of claim 1, wherein the calculating, in substantially real time, from the data on the past play, of the two or more different odds for at least one outcome of an upcoming play using two or more different algorithms is performed automatically upon the determination that the last play has ended.

10. The method of providing wagers in a play by play wagering system of claim 1, wherein the end of the last play is determined by at least one sensor.

11. The method of providing wagers in a play by play wagering system of claim 1, wherein the calculating, in substantially real time, from the data on the past play, of the two or more different odds for at least one outcome of an upcoming play using two or more different algorithms is triggered by occurrence of an event which would be followed by a play.

* * * * *